United States Patent
Kruger

(10) Patent No.: US 9,711,024 B2
(45) Date of Patent: Jul. 18, 2017

(54) BLASTING SYSTEM PROTECTION

(71) Applicant: DETNET SOUTH AFRICA (PTY) LTD, Sandton (ZA)

(72) Inventor: Michiel Jacobus Kruger, Sandton (ZA)

(73) Assignee: DETNET SOUTH AFRICA (PTY) LTD, Sandton (ZA)

( * ) Notice: Subject to any disclaimer, the term of this patent is extended or adjusted under 35 U.S.C. 154(b) by 0 days.

(21) Appl. No.: 14/422,944

(22) PCT Filed: Jun. 14, 2013

(86) PCT No.: PCT/ZA2013/000043
§ 371 (c)(1),
(2) Date: Feb. 20, 2015

(87) PCT Pub. No.: WO2014/032062
PCT Pub. Date: Feb. 27, 2014

(65) Prior Publication Data
US 2015/0228173 A1    Aug. 13, 2015

(30) Foreign Application Priority Data
Aug. 24, 2012   (ZA) .................. 2012/06376

(51) Int. Cl.
*G01W 1/00*    (2006.01)
*G08B 21/02*   (2006.01)
*F42D 1/05*    (2006.01)
*F42D 5/00*    (2006.01)
*G05B 9/02*    (2006.01)

(52) U.S. Cl.
CPC ............. *G08B 21/02* (2013.01); *F42D 1/05* (2013.01); *F42D 5/00* (2013.01); *G05B 9/02* (2013.01)

(58) Field of Classification Search
CPC .. G10H 1/00; G10H 1/0058; G10H 2220/521; G10H 2230/095; G10H 2230/101; G10H 2230/115; G10H 2230/145; G10H 2230/271; G10H 3/26;
(Continued)

(56) References Cited

U.S. PATENT DOCUMENTS 3,914,732 A   10/1975  Brumleve et al.
4,581,997 A * 4/1986   Simpson ............. F42D 1/045
                                                   102/200

(Continued)

FOREIGN PATENT DOCUMENTS

GB   2304241 A    12/1997
WO   0171272 A2   9/2001

OTHER PUBLICATIONS

International Preliminary Report on Patentability for PCT/ZA2013/000043, international filing of Jun. 14, 2013, mailed Dec. 8, 2014, 6 pages.
(Continued)

*Primary Examiner* — Daniel Previl
(74) *Attorney, Agent, or Firm* — Cantor Colburn LLP

(57) ABSTRACT

A method of controlling the operation of a blasting system which includes the steps of monitoring for the occurrence of electromagnetic interference (EMI) within a defined zone and initiating an alarm upon detection of such interference wherein the initiation of the alarm can automatically inhibit or suspend the operation of the blasting system.

6 Claims, 1 Drawing Sheet

(58) Field of Classification Search
CPC ........ G10H 1/0066; G10H 1/348; G10H 1/46;
G10H 2220/525; G10H 3/18
USPC ....... 340/601, 480, 488, 516, 539.26, 545.3,
340/567, 552, 561
See application file for complete search history.

(56) References Cited

U.S. PATENT DOCUMENTS

| | | | | |
|---|---|---|---|---|
| 5,243,911 | A * | 9/1993 | Dow | F42B 3/188 |
| | | | | 102/202.2 |
| 5,700,743 | A * | 12/1997 | Puchinger | B29C 70/088 |
| | | | | 428/337 |
| 6,586,920 | B1 * | 7/2003 | Hirakawa | G01W 1/16 |
| | | | | 324/72 |
| 2005/0041355 | A1 * | 2/2005 | Page | G01W 1/16 |
| | | | | 361/117 |
| 2012/0029853 | A1 * | 2/2012 | Baumheinrich | G01R 29/0842 |
| | | | | 702/65 |
| 2012/0154971 | A1 * | 6/2012 | Brashear | H02H 3/22 |
| | | | | 361/118 |

OTHER PUBLICATIONS

International Search Report for PCT/ZA2013/000043, international filing of Jun. 14, 2013, mailed Nov. 14, 2013, 4 pages.
Written Opinion for PCT/ZA2013/000043, international filing of Jun. 14, 2013, mailed Sep. 4, 2014, 5 pages.

* cited by examiner

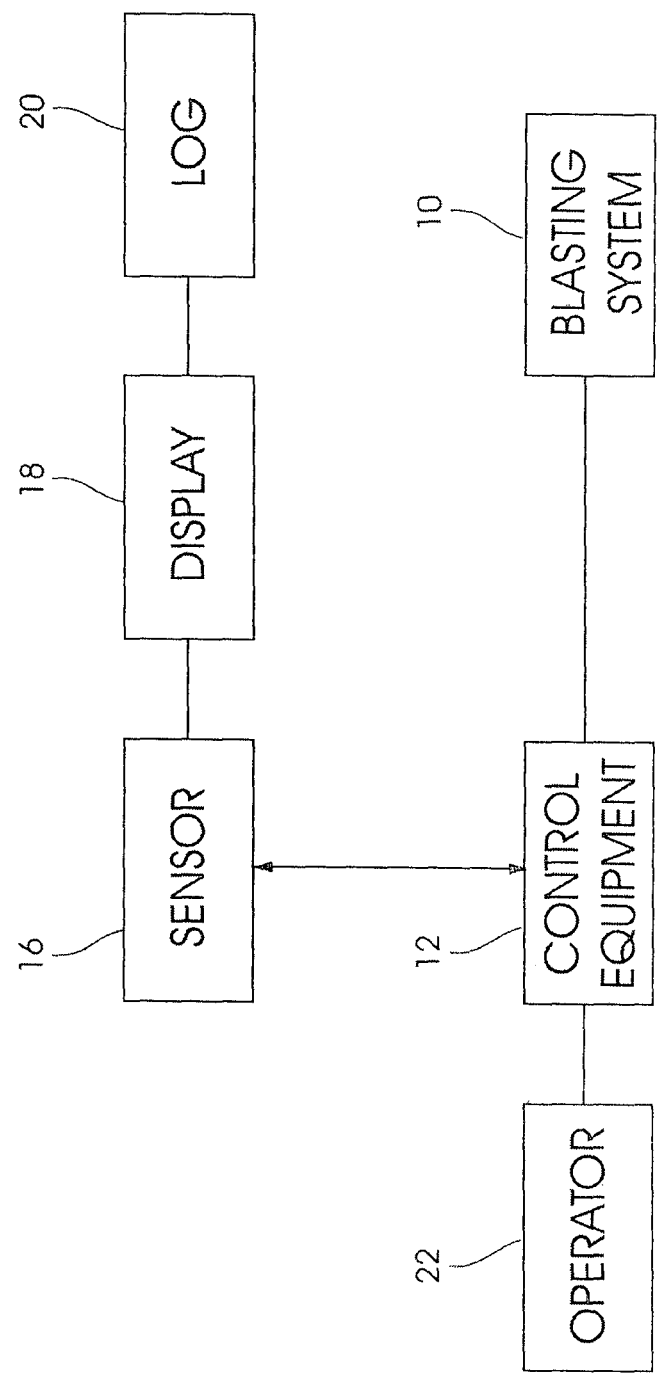

BLASTING SYSTEM PROTECTION

CROSS-REFERENCE TO RELATED APPLICATIONS

This application is a U.S. national stage application of International Application No. PCT/ZA2013/000043 entitled "BLASTING SYSTEM PROTECTION", which has an international filing date of 14 Jun. 2013, and which claims priority to South African Patent Application No. 2012/06376, filed 24 Aug. 2012.

BACKGROUND OF THE INVENTION

This invention relates to controlling the implementation or operation of a blasting system and, more particularly, to protecting a blasting system.

SUMMARY OF THE INVENTION

The invention provides a method of controlling the operation of a blasting system which includes the steps of continuously and automatically monitoring for the occurrence of electromagnetic interference (EMI) within a defined zone within which the blasting system is located and initiating an alarm condition upon detecting electromagnetic interference, within the zone, at a predetermined level, or of a predetermined type.

The alarm condition may be notified to an operator of the blasting system. Positive input from the operator may be required, in response to such notification, in order for the operation of the blasting system to be continued.

Thus, upon initiation of an alarm condition, the implementation of the operation of the blasting system or the continued operation thereof may be automatically inhibited or suspended.

The occurrence of EMI may be monitored on any particular basis e.g. on a time, incidence or location basis. EMI activity may be recorded and correlated with significant steps in the implementation of the blasting system. For example, an operator may elect to continue with the implementation of a blasting system in the presence of EMI. Aspects of the performance of the blasting system, such as misfires, which may occur may, subsequently, be correlated to measurements made of EMI activity.

Lightning constitutes a particular form of electromagnetic interference. In many instances the effect of a lightning stroke is more significant than EMI from other sources such as manmade activity. Thus, particularly in respect of lightning, measurements may be made of the number of strokes, the closeness to the blasting system of the strokes, and so on. A measure may also be obtained of the energy per lightning stroke. This type of information may be used in an attempt to establish a link between lightning energy and activity and the effect thereof on detonators within the blasting system.

Similar observations may be made, in general, of all forms of EMI despite the fact that in most cases lightning activity poses the primary danger to an electronically based blasting system. Manmade electromagnetic noise however can nonetheless have a significant effect on an electronically based blasting system for such EMI can lead to malfunctioning, misfires, unwanted initiation, and so on. Thus, techniques used to monitor lightning activity can be used on a broader basis to monitor EMI activity in general. Of particular concern here is EMI activity at a particular frequency range or which gives rise to a signal level which could be high enough to interfere with the reliable working of a blasting system. It therefore falls within the scope of the invention to monitor EMI activity for signal level and for a dominant frequency of the interference. Those parameters are however exemplary and are non-limiting for if other factors are determined which could adversely affect the working of a blasting system arrangements would be made to monitor for their occurrence.

As the incidence of EMI raises the noise level in a blasting system adjustments may be effected, preferably automatically, to electronic components in the blasting system to compensate for the effect of such noise.

BRIEF DESCRIPTION OF THE DRAWINGS

The invention is further described by way of example with reference to the accompanying drawing which illustrates in block diagram form the use of the method of the invention.

DESCRIPTION OF PREFERRED EMBODIMENTS

The accompanying drawing illustrates in block diagram form a blasting system 10 which is under the control of equipment 12. Typically the system 10 includes at least one electronic detonator located in a respective borehole in which explosives are positioned. The control equipment 12 may be linked by conductors, or through the use of wireless techniques, to the individual detonators. The control equipment exercises timing and firing control, at least, over the detonators. These aspects are generally known in the art and for this reason are not further described herein.

The control equipment 12 is linked to one or more EMI sensors 16 which are configured to monitor the occurrence of electromagnetic noise, including lightning, in a defined region, automatically and continuously. The sensors may be provided separately from the control equipment. Alternatively the sensors may form part of or may be integrated into the control equipment. The blasting system 10 is located within that region. The extent of the region depends, at least, on the sensitivity of each sensor. In order to enlarge the region it may be necessary to link various sensors together with each sensor being positioned at a defined position. Such linking may be effected using conductors, fibre optic links or the like, or by using wireless techniques.

Each sensor is capable of detecting electromagnetic noise which may be generated by diverse means. Typically certain types of human activity and the operation of some electrical machinery and equipment can lead to the production of electromagnetic noise. Atmospheric factors give rise to electromagnetic noise in the form of lightning strokes. Depending on the nature of the source which generates electromagnetic interference a sensor can be used to provide an estimation of the distance between the source and the sensor. In the case of lightning for example it is possible to use the sensor to give an indication of the energy released during a lightning stroke. At the least the sensor provides an indication of the strength of the electromagnetic interference, at the sensor. Optionally this is related to the frequency of the interference.

The sensor embodies an algorithm which is capable of validating an incoming signal pattern so that manmade disturbances can be distinguished from lightning strokes. The sensor is set to monitor the level of the interference so that an activity which is potentially harmful to the reliable operation of the blasting system, whether such activity is the result of human activity or arises from natural causes, can be detected and, as appropriate, action can be taken if necessary.

Information relating to EMI activity detected by the sensor 16 is made available on a display 18 and such information is also recorded or logged in a memory 20. The information is also applied to the control equipment 12. The control equipment, optionally, includes a comparator which includes data related to an energy threshold level which must be exceeded, by energy released by the EMI, in order for the interference to present a danger to the blasting system. When this threshold level is exceeded then the functioning of the control equipment 12 is automatically inhibited in the sense that implementation of the blasting system 10 is suspended. Information on this occurrence is presented to an operator 22 who is then required to acknowledge this information and, if the blasting process is to be continued, the operator must positively input a signal to the control equipment which overrides the inhibiting effect of the EMI.

Lightning constitutes a form of electromagnetic noise and, in the presence of lightning, noise rejection techniques embodied in the control equipment may be enhanced. This is an important aspect for the equipment may be automatically adjusted to work in a high noise environment so that communications are thereby automatically improved.

The EMI sensor or sensors exercise a form of direct control over the execution of a blasting process. Additionally data relating to detected EMI is made available and is logged in the memory 20. If a blasting sequence is not stopped but is continued, under the guidance of an operator, despite the presence of EMI then the performance of the blasting system e.g. misfires, execution of timing intervals and the like can be compared to the EMI level recorded in the memory so that the effect of EMI on the functioning of a blasting arrangement can be assessed.

The invention claimed is:

1. A method of controlling the operation of an electronic based blasting system which includes the steps of continuously and automatically monitoring on a time, incidence, location and energy level basis, for the occurrence of electromagnetic interference (EMI) activity which is caused by lightning within a defined zone within which the blasting system is located, automatically adjusting electronic components in the blasting system to compensate for the effect of the occurrence of EMI activity, recording and correlating EMI activity with respective steps in the implementation of the blasting system, initiating an alarm condition upon detecting EMI, within the zone, at a predetermined level, or of a predetermined type, and wherein upon initiation of said alarm condition, the implementation of the operation of the blasting system or the continued operation thereof is automatically inhibited or suspended.

2. A method according to claim 1 wherein aspects of the performance of the blasting system are correlated to measurements made of lightning activity, and such measurements are selected at least from the following: the number of lightning strokes, the closeness to the blasting system of the lightning strokes, and the energy per lightning stroke.

3. A method according to claim 2 which includes the step of using such correlation to establish a link between lightning energy and activity and the effect thereof on detonators within the blasting system.

4. A method according to claim 1 wherein at least one sensor is used to monitor for the occurrence of lightning and wherein the method includes the step of using the sensor to provide an estimation of the distance between a lightning stroke and the sensor and to give an indication of the energy released during a lightning stroke.

5. A method according to claim 1 which includes the step of using an algorithm to distinguish EMI produced by a lightning stroke at least from EMI which is attributable to a man-made or other disturbance.

6. A method according to claim 1 wherein a measurement of the energy level of detected EMI is used to establish a relationship between such energy level and the effect thereof on detonators within the blasting system.

* * * * *